J. EDGAR.
MILLING MACHINE.
APPLICATION FILED OCT. 29, 1902.

937,057.

Patented Oct. 19, 1909.
3 SHEETS—SHEET 1.

Witnesses
Alfred H. Hildreth
Edward S. Day

Inventor
John Edgar
by his Attorney
Phillips Van Everen & Fish

J. EDGAR.
MILLING MACHINE.
APPLICATION FILED OCT. 29, 1902.

937,057.

Patented Oct. 19, 1909.
3 SHEETS—SHEET 3.

Witnesses
Alfred N. Hildreth
Edward S. Day

Inventor
John Edgar
by his attorneys
Phillips Van Evera & Fish

UNITED STATES PATENT OFFICE.

JOHN EDGAR, OF HYDE PARK, MASSACHUSETTS, ASSIGNOR TO BECKER-BRAINARD MILLING MACHINE COMPANY, OF PORTLAND, MAINE, A CORPORATION OF MAINE.

MILLING-MACHINE.

937,057.  Specification of Letters Patent.  Patented Oct. 19, 1909.

Application filed October 29, 1902. Serial No. 129,238.

*To all whom it may concern:*

Be it known that I, JOHN EDGAR, a subject of the King of Great Britain and Ireland, residing at Hyde Park, in the county of Norfolk and State of Massachusetts, have invented certain new and useful Improvements in Milling-Machines; and I do hereby declare the following to be a full, clear, and exact description of the invention, such as will enable others skilled in the art to which it appertains to make and use the same.

The present invention relates to milling machines.

The object of the invention is to provide an improved mechanism for actuating the feed shaft of a milling machine or other machine tool by hand.

With this object in view the present invention consists in the devices, combinations and arrangement of parts hereinafter described and claimed, the advantages of which will be obvious to those skilled in the art from the following description.

In the accompanying drawings the invention is illustrated as embodied in a machine of that type known in the art as a plane milling machine, the work supporting table in this type of machine being so mounted upon its supporting saddle as to be incapable of any rotary swinging movement thereon. It is to be understood, however, that various features of the invention are not limited to this particular type of machine nor are the various features of the invention limited except as recited in the claims to the specific construction or arrangement of parts illustrated.

Figure 1:
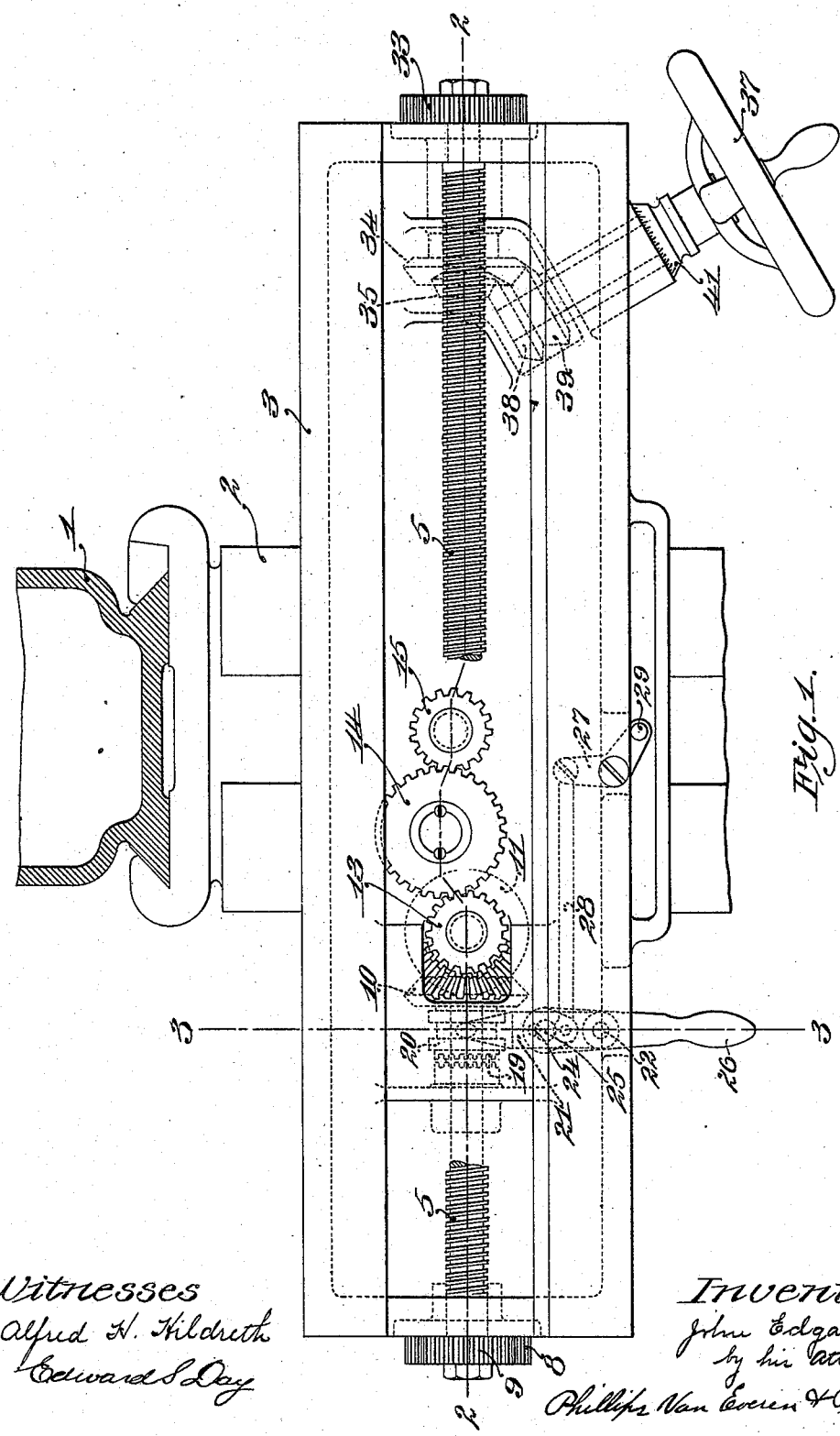
Figure 2:
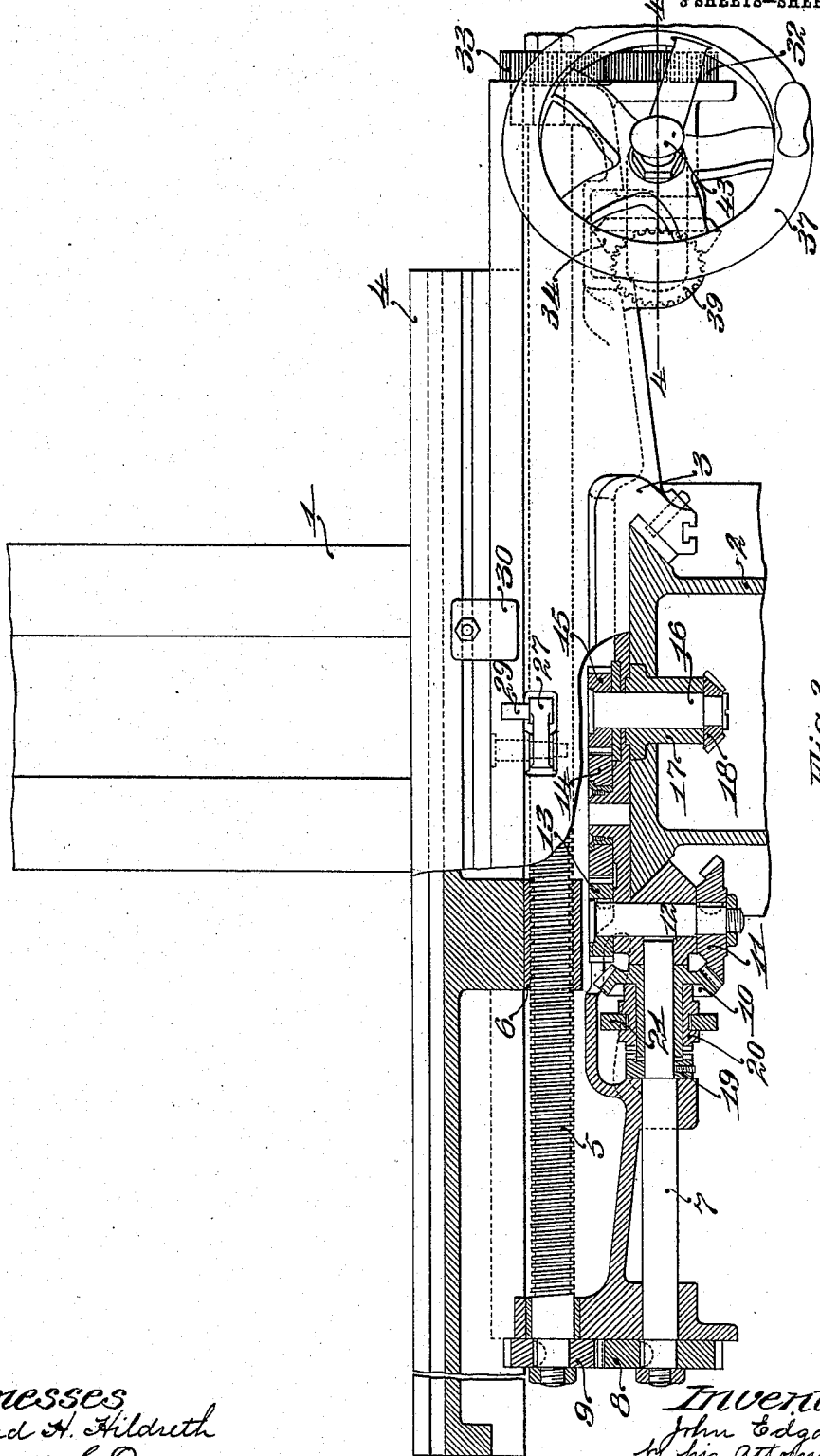
Figure 3:
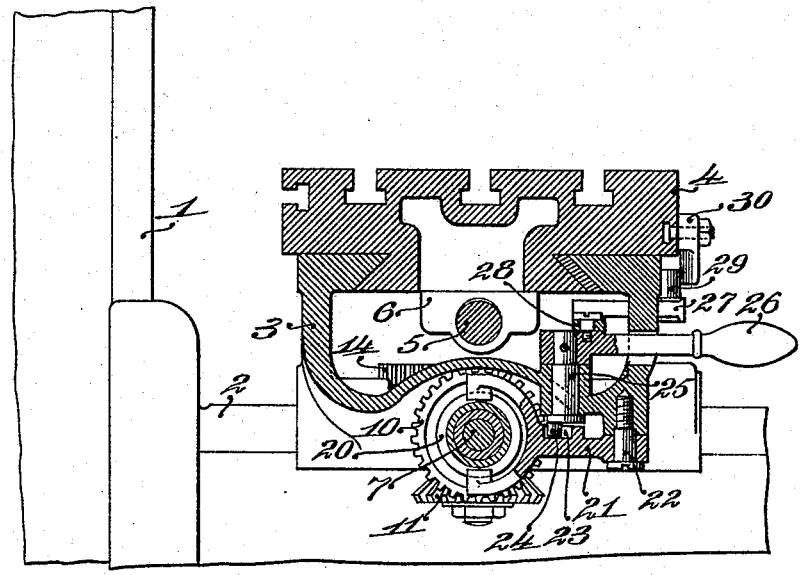
Figure 4:
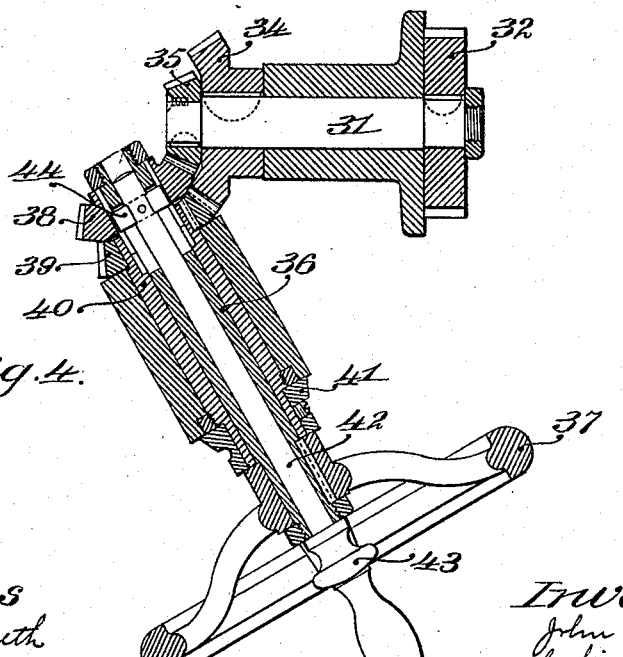

Referring to the drawings, Figure 1 is a plan view of so much of a plane milling machine as is necessary to show the connection of the invention therewith, a portion of the column of the machine being shown in section, the work supporting table being removed and a portion of the feed shaft for actuating the table being broken away; Fig. 2 is a view in side elevation partly in section on the line 2—2 of Fig. 1 of so much of the machine as is illustrated in Fig. 1 with the addition of the work supporting table; Fig. 3 is a sectional view on the line 3—3 of Fig. 1, and Fig. 4 is a detail sectional plan view on the line 4—4 of Fig. 2 illustrating the mechanism for actuating the feed shaft by hand.

1 indicates the column of the machine provided with vertical guideways upon which is mounted the vertically adjustable knee 2.

3 indicates the saddle which is mounted upon horizontal guideways on the top of the knee 2 so as to be capable of moving back and forth thereon, and 4 indicates the work supporting table mounted in guideways on the saddle 3 so as to move back and forth thereon in a direction at right angles to the movement of the saddle 3 on the knee 2.

The general arrangement of the parts above referred to is the same as that commonly found in machines of this class.

The table 4 is moved in its guideways on the saddle 3 by means of a screw-threaded feed shaft 5 engaging a screw-threaded block 6 secured to the under side of the table 4. The shaft 5 is journaled at each end in bearings in the saddle 3 and is held from longitudinal movement with relation to the table so that as the feed shaft is rotated in either direction the table is caused to move longitudinally in its guideways on the saddle 3.

For rotating the shaft 5 two sets of mechanism are provided, one set of mechanism being driven from the power shaft of the machine and acting to automatically rotate the shaft 5 in a direction to cause the table 4 to feed the work supported thereon to the cutting tool, and the other set of mechanism being hand-operated and being arranged to rotate the shaft 5 in either direction and at different speeds. The power driven mechanism for actuating the shaft 5 comprises a shaft 7 journaled in one end of the saddle 3 parallel with the shaft 5 and beneath the same. The outer end of the shaft 7 is provided with a gear 8 which meshes with a gear 9 fast upon one end of the shaft 5. Upon the inner end of the shaft 7 is loosely mounted a bevel gear 10 which meshes with a bevel gear 11 secured to the lower end of a short vertical shaft 12 journaled in the saddle. To the upper end of the shaft 12 is secured a gear 13 which meshes with an intermediate gear 14 meshing with a gear 15 upon the upper end of a short vertical shaft 16. The shaft 16 is journaled in the saddle 3 and in a block 17 secured thereto and projecting downwardly through a slot in the upper surface of the knee 2. To the lower end of the shaft 16 a bevel gear 18 is secured through which motion is imparted to the shaft 16 by mechanism driven from the power shaft of the machine. The mechanism for transmitting motion to the bevel gear 18 may be of any desired construction and as such mechanisms are well known in the art and form no portion of the present invention illustration and description thereof is deemed unnecessary.

When the bevel gear 10 is connected to the shaft 7 the shaft 7 is rotated through the mechanism above described and through the gears 8 and 9 rotates the shaft 5 in a direction to cause the table 4 to feed the work supported thereon to the tool. When the bevel gear 10 is disconnected from the shaft 7 the bevel gear 10 and the train of gearing by which it is actuated rotate idly and the shaft 5 can be rotated by hand in either direction by the hand-operated mechanism hereinafter described. For connecting the bevel gear to the shaft 7 and for disconnecting it therefrom a clutch is provided consisting of a clutch member 19 secured to the shaft 7 and a coöperating clutch member 20 splined upon the hub of the bevel gear so as to rotate therewith and be capable of moving longitudinally thereon. The clutch member 20 is provided with a groove which is engaged by projections from the forked end of a clutch operating lever 21 pivoted at 22 to the saddle 3. About midway between its ends the lever 21 is provided upon its upper surface with a slot 23 which is engaged by a crank pin 24 projecting from the lower end of a short vertical shaft 25 journaled in the saddle 3. To the upper end of the shaft 25 a hand lever 26 is secured which projects into a convenient position to be grasped by the operator. By moving the lever 26 in either direction the lever 21 is swung by the engagement of the crank pin 24 with the lever and the clutch member 20 is moved into and out of engagement with the clutch member 19 and the bevel gear 10 thereby connected to or disconnected from the shaft 7. It will be seen that the relative arrangement of the lever 21, crank pin 24, shaft 25 and lever 26 is such that but very little power must be applied to the lever 26 in order to move the lever 21, and consequently the mechanism for automatically actuating the feed shaft can be easily thrown into and out of operation at any desired time by the operator. In order to throw the mechanism for automatically actuating the shaft 5 out of operation at the end of the work feeding movement of the table 4 a bent lever 27 is pivotally mounted in the saddle 3, one end of the lever being connected by means of a link 28 to the lever 26 and the other end of the lever 27 being provided with a stud 29 arranged to be engaged by the cam surface of a block 30 adjustably secured to one side of the table 4, the construction being such that the lever 27 is moved by the contact of the block 30 with the stud 29 in a direction to rotate the shaft 25 and through the crank pin 24 and lever 21 move the clutch member 20 out of engagement with the clutch member 19.

The mechanism for actuating the feed shaft by hand is illustrated in detail in Fig. 4. Referring to this figure 31 indicates a shaft mounted in bearings in the opposite end of the saddle 3 to that in which the shaft 7 is mounted, said shaft being arranged parallel with the feed shaft and having secured to its outer end a gear 32 meshing with a gear 33 upon the end of the feed shaft 5, as is clearly shown in Figs. 1 and 2. To the inner end of the shaft 31 are secured bevel gears 34 and 35 of which the gear 34 is considerably the larger. A shaft 36 is mounted in the saddle 3 at an angle to the shaft 31 and in the same horizontal plane. To the outer end of this shaft is secured a hand wheel 37 and upon the inner end two bevel gears 38 and 39 are loosely mounted, these gears being of the same size and the gear 38 being mounted directly upon the shaft while the gear 39 is secured to a sleeve 40 surrounding the shaft 36 and forming a bearing therefor. The sleeve 40 is mounted in a bearing in the saddle 3 and is provided at its outer end with an index dial 41. The bevel gear 38 meshes with the bevel gear 35 and the bevel gear 39 meshes with the bevel gear 34, these gears being thus arranged in two sets. Either set of these gears may be utilized in transmitting the motion of the hand-operated shaft 36 to the intermediate shaft 31 and to the feed shaft, one set of gears being inoperative while the other set is operative. For rendering either set of gears operative a clutch rod 42 is provided extending axially through the shaft 36. At its outer end the rod 42 is provided with a handle or knob 43 by means of which it can be moved longitudinally, and at its inner end it is provided with two radial projections 44 which extend through diametrically opposite slots in the shaft 36 and are arranged to engage keyways formed in the gear 38 and in the sleeve 40. The inner end of the sleeve 40 is provided with a circular recess to receive the projection 44 when the rod 42 is in its intermediate position, both sets of gears being rendered inoperative when rod 42 is in this position. When the gear 38 is clutched to the shaft 36 and the shaft 36 is rotated by means of the hand wheel 37 a comparatively rapid movement of rotation will be imparted to the feed shaft 5, and when the gear 39 is clutched to the shaft 36 a comparatively slow movement of rotation will be imparted to the feed shaft. The feed shaft can be actuated in either direction when either the gear 38 or the gear 39 is clutched to the shaft 36, but in practice the gear 39 is generally utilized to actuate the feed shaft in a direction to impart a work feeding movement to the table 4 and gear 38 to impart a return movement thereto, the provision of the gear 38 and small gear 35 enabling the return movement of the table 4 to be accomplished quickly after the table has been moved either automatically or by hand to feed the work to the tool. By moving the rod 42 into its intermediate position both gears 38 and 39 are disconnected from the shaft 36. When the rod 42 is in this position and the feed shaft 5 is rotated automatically through the power driven mechanism, the hand-wheel 37 remains at rest as it is disconnected from the feed shaft. Also when the rod 42 is in this position and the feed shaft 5 is at rest a rotation of the hand-wheel 37 has no effect upon the feed shaft. An objectionable and useless movement of the hand-wheel 37 during the automatic actuation of the feed shaft 5 can thus be avoided and also an accidental or malicious actuation of the feed shaft 5 after the table has been set in a certain position can be prevented.

It will be noted that the ends of the saddle project a considerable distance beyond the knee upon which it is supported. By reason of this construction a long feed shaft can be used and a corresponding long feeding movement imparted to the work supporting table; also the power driven mechanism for automatically actuating the feed shaft can be conveniently and compactly arranged and the hand-operated mechanism for actuating the feed shaft can be arranged in a position to be easily accessible by the operator.

A further advantage gained by this construction is that a long bearing surface is provided for the work supporting table so that a long feeding movement can be imparted to the table without projecting the table beyond the saddle a sufficient distance to cause cramping of the table in its guideways.

Having thus indicated the nature and scope of my invention and having specifically described a preferred form thereof, I claim as new and desire to secure by Letters Patent of the United States.

1. A milling machine, having, in combination, a feed shaft, a work supporting table operated thereby, a hand-operated shaft and an intermediate shaft angularly disposed with relation to each other, gearing connecting the intermediate shaft and the feed shaft, two sets of bevel gears connecting the hand-operated shaft and the intermediate shaft arranged to impart different speeds to the intermediate shaft for a given speed of the hand-operated shaft, and means for throwing either set of gears into operation and for throwing both sets of gears out of operation, substantially as described.

2. A milling machine, having, in combination, a saddle, a feed shaft journaled therein, a shaft journaled in one end of the saddle parallel with the feed shaft, gearing connecting said shaft and the feed shaft, power driven mechanism for actuating said shaft, an intermediate shaft journaled in the other end of the saddle parallel with the feed shaft, a hand-operated shaft journaled in the saddle at an angle to the intermediate shaft, gearing connecting the intermediate shaft and the feed shaft, two sets of bevel gears connecting the hand-operated shaft and the intermediate shaft arranged to impart different speeds to the intermediate shaft for a given speed of the hand-operated shaft, and means for throwing either set of gears into operation.

3. A milling machine having, in combination, a feed shaft, a work supporting table operated thereby, a hand operated shaft, and an intermediate shaft angularly disposed with relation to each other, gearing connecting the intermediate shaft and the feed shaft, two sets of bevel gears connecting the hand operated shaft and the intermediate shaft arranged to impart different speeds to the intermediate shaft for a given speed of the hand operated shaft and means for throwing either set of gears into operation and for throwing both sets of gears out of operation including a rod mounted to slide axially of the hand operated shaft and a clutch projection on said rod arranged to engage either of said gears and clutch the gear to the hand operated shaft, substantially as described.

4. A milling machine, having, in combination, a saddle, a feed shaft journaled therein, a work supporting table actuated thereby, a hand operated shaft and an intermediate shaft also journaled therein angularly disposed with relation to each other, gearing connecting the feed shaft and the intermediate shaft, two bevel gears fast on the intermediate shaft, two bevel gears meshing therewith loosely mounted on the hand operated shaft, and means for clutching either of said last mentioned gears to the hand operated shaft including a rod mounted to slide axially of the hand operated shaft and a clutch projection on the said rod arranged to engage either of said gears, substantially as described.

In testimony whereof I affix my signature, in presence of two witnesses.

JOHN EDGAR.

Witnesses:
 ALFRED H. HILDRETH,
 HENRIETTA C. RAYNER.